United States Patent
Boucher

[15] 3,700,251
[45] Oct. 24, 1972

[54] CONVERTIBLE SIDEWALK BIKE
[72] Inventor: Raymond W. Boucher, Dothan, Ala.
[73] Assignee: Hedstrom Company, Bedford, Pa.
[22] Filed: July 1, 1971
[21] Appl. No.: 158,680

[52] U.S. Cl. ............................................. 280/7.11
[51] Int. Cl. ......................................... B62k 13/00
[58] Field of Search ..................... 280/7.11, 278, 287

[56] References Cited

UNITED STATES PATENTS 2,804,310   8/1957   Hokleanen ............... 280/7.11
2,997,308   8/1961   Boudreau ................. 280/7.11

*Primary Examiner*—Gerald M. Forlenza
*Assistant Examiner*—Frank E. Werner
*Attorney*—Cesari & McKenna

[57] ABSTRACT

A cross-bar hinge for a convertible boy-girl bike employs a T-shaped tab projecting from the forward end of the cross-bar which seats in a notch formed in the upper rear edge of the head tube. A cap engages over the upper end of the head tube which locks the tab in the notch, yet allows the bar to swing between the upper and lower positions.

6 Claims, 3 Drawing Figures

PATENTED OCT 24 1972 3,700,251

INVENTOR
RAYMOND W. BOUCHER
BY
Cesari and McKenna
ATTORNEYS

CONVERTIBLE SIDEWALK BIKE

BACKGROUND OF THE INVENTION

This invention relates to a child's sidewalk bicycle. It relates more particularly to an improved cross-bar attachment by which the bike may be converted from a girl's bicycle to one suitable for use by a boy.

Convertible boy-girl bicycles are not new. Generally, the bicycle has a cross-bar which is pivoted at its forward end to the head tube and which is adjustably connected at its rear end to an upper location on the saddle pillar if the bicycle is to be used by a girl, or at a lower location thereon if a boy is to ride the bicycle. Examples of conventional convertible bicycles are disclosed in U. S. Pat. Nos. 1,744,417, 2,804,317, 1,279,081 and 2,997,308.

These prior patents disclose particular hinge connections between the forward end of the cross-bar and the bicycle head tube. For one reason or another, these prior hinges are not suitable for today's mass-produced bicycles. Either they are too expensive to incorporate into the bicycles, or they do not provide a secure enough connection between the cross-bar and the rest of the bicycle frame.

SUMMARY OF THE INVENTION

Accordingly, this invention aims to provide a convertible boy-girl sidewalk bicycle having an improved cross-bar hinge construction.

A further object of the invention is to provide a convertible bicycle having a cross-bar hinge which is relatively easy and inexpensive to incorporate into the bicycle.

A further object of the invention is to provide a convertible boy-girl sidewalk bike having a movable cross-bar which is securely fastened to the bicycle frame in both of its operative positions.

Other objects of the invention will in part be obvious and will in part appear hereinafter.

The invention accordingly comprises the features of construction, combination of elements and arrangement of parts which will be exemplified in the construction hereinafter set forth, and the scope of the invention will be indicated in the claims.

In general, the bicycle frame is of conventional construction. It has the usual head tube in which is journaled the bicycle steering post. The bicycle's saddle pillar is connected to the head tube by means of an upwardly forwardly inclined stay tube. The cross-bar which is the subject of the present invention is pivotally connected at its forward end to the upper end of the head tube. The rear end of the cross-bar is removably connected in the usual fashion at either one of two locations on the saddle pillar. When the cross-bar is secured in its upper position, it is oriented substantially horizontally so that the bicycle is suitable for a boy. When the cross-bar is fastened in its other position on the saddle pillar, the bicycle is suitable for a girl.

The pivotal connection between the forward end of the cross-bar and the head tube is of unusually simple construction. A tab having sideways-extending ears projects out from the forward end of the cross-bar. The tab is received in a generally rectangular notch cut in the rear of the head tube at the upper end thereof. When the tab is positioned in the notch, the sideways extending ears engage the head tube wall and prevent the tab from being pulled out of the notch. The usual head tube cap is engaged over the upper end of the head tube. The tap closes the mouth of the notch so that the tab cannot be removed therefrom. Still, however, enough clearance remains between the tab and the bottom edge of the notch and the rim of the cap so that the cross-bar can be swung between its upper and lower positions.

The present cross-bar construction has several distinct advantages over conventional ones. It requires no screws or other fittings that might become lost. Also, the cross-bar cannot be removed from the head tube. Further, manufacture of the elements comprising the pivotal connection, to wit, the notch and the tab, involves simple stamping operations. In this connection, we should mention that it is much easier to properly form a notch at the end of the head tube than a hole in the tube wall. This is because in the latter case, the tube is sometimes deformed when the hole is punched out. Finally, the cross-bar is easily assembled to the remainder of the frame. This is a particularly desirable feature since most of today's sidewalk bikes are assembled in the home by a parent who may not be particularly mechanically inclined.

BRIEF DESCRIPTION OF THE DRAWING

For a fuller understanding of the nature and objects of the invention, reference should be had to the following detailed description taken in connection with the accompanying drawing, in which.

DESCRIPTION OF THE PREFERRED EMBODIMENT

Figure 1:
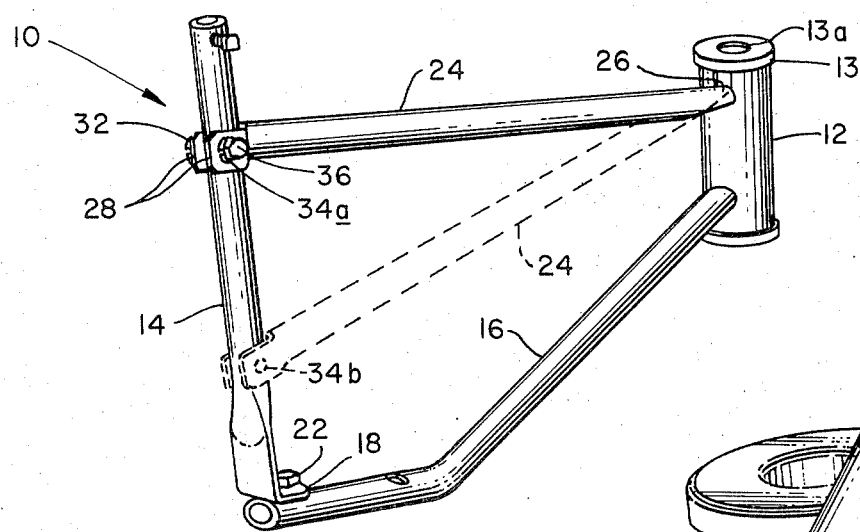
FIG. 1 is an isometric view of a convertible boy-girl bicycle incorporating the principles of this invention.

Turning now to FIG. 1 of the drawing, the bicycle frame shown generally at 10 is comprised of a generally vertically oriented head tube 12 and an upwardly rearwardly inclining saddle pillar 14. A lower stay tube 16 is connected at its rear end to a tab 18 at the lower end of pillar 14 by means of a bolt 22. The forward end of stay tube 16 is butt-welded to tube 12 at the lower end thereof.

A generally tubular cross-bar 24 stretches between head tube 12 and saddle pillar 14. The forward end of cross-bar 24 is hinged to tube 12 by a pivot shown generally at 26 to be described later. The rear end of cross-bar 24 has a pair of spaced tab extensions 28 which engage opposite sides of saddle pillar 14. Extensions 28 are provided with bolt holes 32 near their centers.

Transverse bolt holes 34a and 34b are also provided in the saddle pillar 14. Bolt hole 34a is located relatively high up on the pillar 14, while bolt hole 34b is closer to its lower end. When the holes 32 in extensions 28 are aligned with the upper hole 34a pillar 14, the cross-bar 24 is substantially horizontal. The cross-bar may be secured in this position by means of a bolt 36 extending through holes 32 and 34a with a nut tightened down on the bolt. In this position, the bicycle is suitable for use by a boy.

Cross-bar 24 can also be swung down to a lower position shown in dotted lines wherein the holes 32 are aligned with hole 34b in the pillar. When the bar is secured in this position by bolt 36, the bicycle may be used by a girl.

Figure 2:
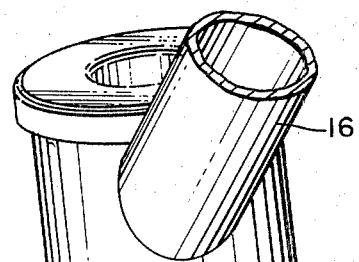
FIG. 2 is an exploded fragmentary isometric view on a larger scale showing the bicycle cross-bar connection in greater detail.
Figure 3:
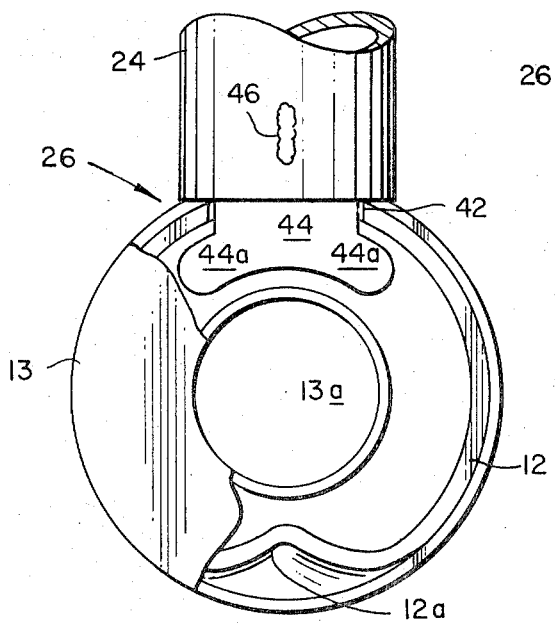
FIG. 3 is a fragmentary top view with parts cut away showing the cross-bar connection in still greater detail.

Turning now to FIGS. 2 and 3, the pivot 26 comprises a generally rectangular notch 42 at the upper end of tube 12 directly above the end of stay 16. This notch at the end of the tube can be stamped out without deforming the cylindrical shape of the tube.

A tab 44 projects out from the forward end of cross-bar 24. The portion of the tab extending into the cross-bar is spot-welded to the wall of the cross-bar is shown at 46. Tab 44 has a pair of sideways-extending ears 44a which make the tab 44 somewhat wider than the width of notch 42. As best seen in FIG. 2, the underside of the cross-bar 24 near its forward end s crushed in so that it has a generally arcuate or crescent-like shape adjacent the tab. This is done in order to provide a more firm weld 46 and also to provide clearance when the cross-bar 24 is swung between its two operative positions.

To install the cross-bar initially, the tab 44 is dropped down into notch 42 prior to seating the upper tube cap 13. Next, the cap 13 is engaged over the top of tube 12 and pressed down until it seats firmly on the tube. The edge of the head tube 12 is bent or punched in at 12a which helps to retain the cap on the tube. In any event, once the steering post is installed, the caps 13 held firmly in place on the tube. It should be mentioned at this point that the tube 44 is recessed at 45 to accommodate the post.

When the cap 13 is seated, it closes the mouth of notch 42 so that the cross-bar 24 or, more accurately, its tab 44, cannot be lifted out of the notch. On the other hand, the ears 44a on tab 44 prevent the bar from being retracted from the notch. Accordingly, the cross-bar is permanently secured to the head tube. Yet, sufficient clearance remains between the lower edge of notch 42 and the edge of the upper cap 13 to permit the cross-bar 24 to swing between its upper and lower positions described above.

Thus, the cross-bar hinge construction described herein is simple and inexpensive to make and impelement. Yet it provides a secure pivotal connection between the cross-bar and the head tube.

It will thus be seen that the objects set forth above, among those made apparent from the preceding description,

I claim:

1. In a convertible sidewalk bicycle having a head tube, a saddle pillar, a lower stay tube extending from the lower end of the saddle pillar to the lower end of the head tube and a tubular cross-bar having its forward end pivotally connected to the head tube and its rear end connected alternatively to upper and lower locations on the saddle pillar, the improvement comprising a notch formed at the upper end of the head tube in the rear wall thereof, a tab projecting out from the forward end of the cross-bar, said tab having ears at the forward end thereof which make the tab as a whole larger than the notch in the head tube and a head tube cap engaged over the upper end of the head tube after the tab is positioned in the notch which closes off the mouth of the notch and whose lower edge is spaced sufficiently from the bottom wall of the notch to accommodate movement of the tab when the cross-bar is swung between its two operative positions.

2. The bicycle defined in claim 1 and further including a tab extension at the rear end of the cross-bar which engages the saddle pillar and a bolt extending through the tab extension and the saddle pillar when the cross-bar is in either of its operative positions.

3. The bicycle defined in claim 1 and further including a dent formed in the upper edge of the head tube which deforms the head tube enough to retain the cap in place on the tube.

4. The bicycle defined in claim 1 wherein the tab is generally T-shaped with its leg being welded to the wall of the cross-bar.

5. The bicycle defined in claim 4 wherein the underside of the cross-bar is crushed upwards near the forward end thereof to close the end of the cross-bar and give it a generally arcuate shape.

6. The bicycle defined in claim 1 wherein the tab is shaped to accommodate a steering post journaled in the head tube.

* * * * *